United States Patent [19]
Herrnsdorf

[11] Patent Number: 5,872,830
[45] Date of Patent: Feb. 16, 1999

[54] DEVICE AND METHOD OF IMAGING OR MEASURING OF A RADIATION SOURCE

[75] Inventor: Lars Herrnsdorf, Lindome, Sweden

[73] Assignee: RTI Electronics AB, Molndal, Sweden

[21] Appl. No.: 648,190

[22] PCT Filed: Nov. 25, 1994

[86] PCT No.: PCT/SE94/01134

§ 371 Date: Jul. 8, 1996

§ 102(e) Date: Jul. 8, 1996

[87] PCT Pub. No.: WO95/14941

PCT Pub. Date: Jun. 1, 1995

[30] Foreign Application Priority Data

Nov. 25, 1993 [SE] Sweden ................................ 9303914

[51] Int. Cl.[6] .................................................. G01D 18/00
[52] U.S. Cl. .................................. 378/207; 378/210
[58] Field of Search ............................................. 378/207

[56] References Cited

U.S. PATENT DOCUMENTS 4,442,539  4/1984  Aichinger et al. ...................... 378/207

FOREIGN PATENT DOCUMENTS 0089148  9/1983  European Pat. Off. .

*Primary Examiner*—Craig E. Church
*Attorney, Agent, or Firm*—Birch, Stewart, Kolasch & Birch, LLP

[57] ABSTRACT

A simplified method and a device to determine the size and/or the location of focus of an X-ray tube. By means of a slit camera a longish image of the extension of the focal spot is achieved in one direction, the image of which normally is recorded photographically and can be analyzed by a microdensitometer. This is a time-consuming and circumstantial procedure, which normally requires many exposures. According to the invention a slit image is utilized in the same manner as in the slit-camera but instead of a photographic film for the recording one uses a line sensor with its sensor elements being arranged parallel to the slit and at least cover the width of the slit image in question. With this arrangement a pronounced electric signal from a single exposure is obtained due to that each line sensor element detects the signal from sections across the slit along the whole length of the sensor.

11 Claims, 1 Drawing Sheet

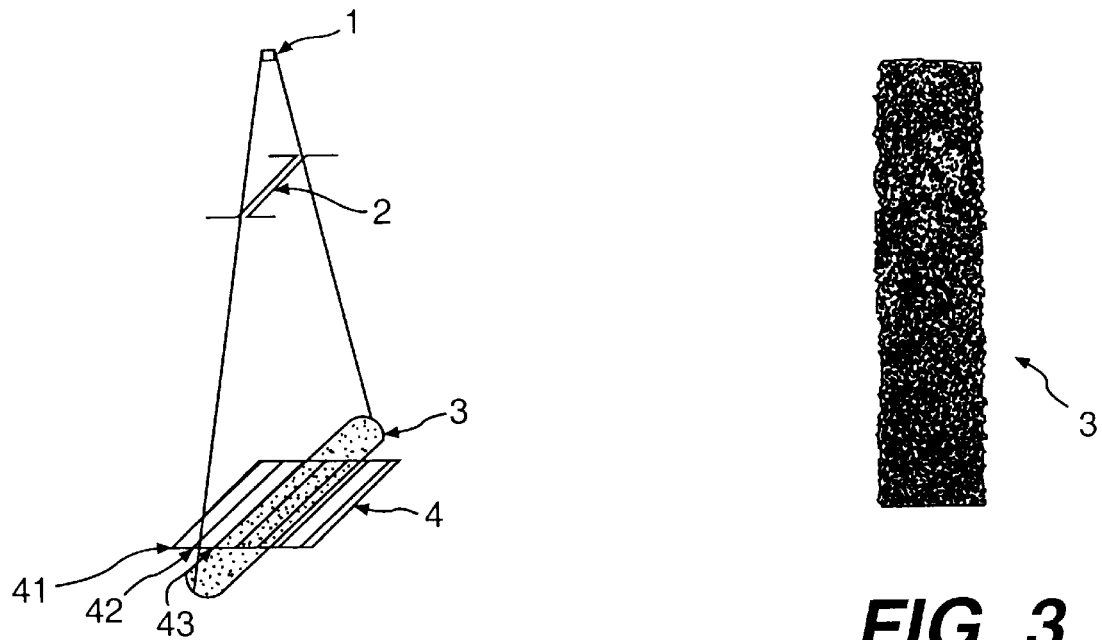
FIG 1
FIG. 3
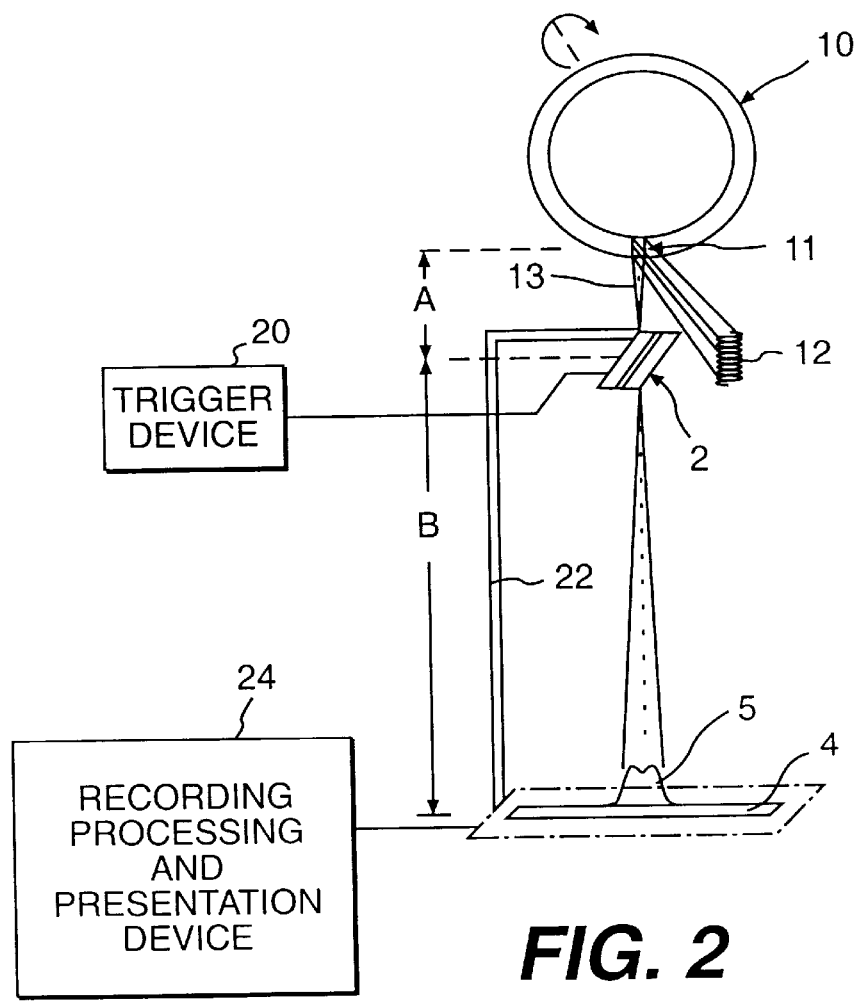
FIG. 2

DEVICE AND METHOD OF IMAGING OR MEASURING OF A RADIATION SOURCE

FIELD OF THE INVENTION

The present invention refers to methods and devices to perform measurements on beams of X-rays. When required the same methods and devices may also be utilized to perform measurements on radiation of other wavelengths, such as visible light.

In particular the invention refers to a simplified method and a device to determine the size and/or the location of focus of an X-ray tube- However, it can also be utilized in other applications, such as for example to determine the location of a light source that is utilized for adjustment of an X-ray apparatus.

DESCRIPTION OF THE BACKGROUND ART

An object of the present invention is to be able to control the position and the size of the focal spot of the X-ray tube in an X-ray equipment for diagnostics which normally is provided with an X-ray tube with rotary anode, but the technique according to the invention can also be utilized in other equipment. By determination of the size of the focal spot of an X-ray tube, a method according to IEC 336 is normally used. By means of a slit-camera a longish image is achieved which constitutes a projection of the extension of the focal spot in one direction, the image of which is recorded photographically and can be analyzed by a microdensitometer. This is a time-consuming and circumstantial procedure, which in addition can be marred by unnecessary error sources. When measuring on weak X-ray generators which are utilized for instance in connection with mammography, a large number of exposures have to be made to obtain sufficient density on a film of the image through the slit. Differences in the position of the X-ray tube and of the measuring equipment at the various exposures may occur, whereby the image does not become correct. Moreover, only this part of the measurement becomes time-consuming, thereafter time has to be included for development and read-out of the image.

SUMMARY OF THE INVENTION

In the present invention it is possible by one single exposure to produce data for an image of the focal spot of the X-ray tube. This is achieved by means of a design according to the subsequent patent claims. According to the invention a slit is utilized in the same manner as in the slit camera but instead of a photographic film for the recording, one uses a line sensor with sensor elements being arranged parallel to the slit and at least cover the width of the slit image in question. With this arrangement a pronounced electric signal is obtained from a single exposure due to each line sensor element sensing the signal from sections across the slit along the whole length of the sensor.

Besides giving a strong output signal the utilization of the line sensor has also other advantages. Common CCD-sensors for visible light can normally not be utilized to detect emission of X-rays due to the fact that electronic components belonging to the sensor elements spread out over the sensor surface are negatively influenced by emission of X-rays, whereby the sensitive components cannot be screened from the radiation. At the line sensor, the electronic components are collected at the rear and of the sensor elements. This end can be screened off from X-ray beams without the sensor area being reduced. Sensors which normally are designed for light may thereby also be used for detection of X-ray emission. This is particularly advantageous if the same slit and sensor can be used both for measurement of X-ray focus and of the lamp for visible light that usually is used for adjustment of the image field on a patient, since the conformity between visible image field and X-ray image field then may be controlled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in closer detail with reference to the drawings which are given by way of illustration only, and thus are not limitative of the present invention, and in which:

FIG. 1 diagrammatically shows the principle of the invention,

FIG. 2 diagrammatically shows a device to measure position and size of the focal spot of an X-ray tube according to the invention, and FIG. 3 shows an image of the focal spot through the slit.

DETAILED DESCRIPTION OF THE PREFERRED EMBODIMENTS

FIG. 1 shows a beam source 1, a slit 2, a slit image 3 and a line sensor 4. The slit image 3 constitutes a projection of the light source 1 through the slit 2. The slit image being somewhat simplified can be regarded to consist of a row of images of the light source which have each been projected through a part of the slit analogous with the projection by an aperture camera. The projections superposed in this manner in the longitudinal direction of the slit across the slit have an intensity distribution with contribution from all parts of the radiation source, and which are equal for all sections across the slit, apart from marginal effects at the short ends of the slit. By detecting the intensity by means of line sensor elements 41, 42, 43 and so on, which are arranged parallel to the slit, the intensity distribution is obtained in a simple way for a section across the slit, which gives an indication about the position of the radiation source and extension in this direction. The line sensor elements give a many times stronger output signal than what should be possible to obtain from sensors of other types, which can give a distinct output signal even from a weak radiation source and a narrow slit.

In FIG. 2, the rotary anode 10, filament 12, and focal spot 11 on the anode 10 of an X-ray tube are diagramatically shown. The X-ray beam 13, which by a conventional method is extracted from the anode essentially perpendicular to its rotation axis, is directed against the slit 2, and a part of the ray 13 is guided through the slit and is incident on the sensor 4. The intensity distribution across the slit of the beam that is incident on the sensor is indicated by the diagram 5. A photographic recording of a part of the slit image is shown in FIG. 3. The sensor 4 is a line sensor with a large number of line sensor elements arranged parallel to the slit 2. In a suitable sensor, the line sensor elements are 25 $\mu$m×2,5 mm and a sensor with 1024 elements has a length of 25,6 mm. When reading the intensity curve across the slit with this sensor, about 100 times stronger output signals from the sensor elements is obtained, than if a sensor with square shaped sensor elements with same resolution had been used.

A method of measuring the size of the focal point of an X-ray tube can be performed with a sensor according to the above, a slit, a trigger detector and equipment for recording, processing and presentation of measurement values, whereby the measuring method can be based on recommendations according to IEC 336. The slit is placed on a stand 22 above the sensor so that it runs perpendicular to the extension of the line sensor and thereby parallel to line elements of the sensor. This is directed such that the X-ray through the slit is calculated to be incident on the sensor and where the slit is located parallel with or perpendicular to the projected image of the electron path between the cathode and the anode in a plane perpendicular to the direction of the X-ray beam. A trigger detector 20 is located in the proximity of the slit to detect the start of an X-ray exposure and trigger the equipment 24 for recording, processing and presentation so that a new recording is performed. The equipment records a sequence of measurement values from the line sensor elements and presents these as a graph on a display. In addition the equipment can be provided with software in order to process the measurement values and present them in a processed form, for instance as a MTF-chart (MTF= Modulation Transfer Function). The stand with the slit and the line sensor subsequently is rotated 90 degrees and a new measurement is carried out. From both intensity charts thus obtained the extension of the focal point can be deter Lied in two perpendicular directions. This can be carried out by means of built-in software. The equipment for recording, processing, and presentation of the measurement values can be constituted by a preferably portable personal computer with appropriate software and interface for signals from the line sensor.

In order to develop an absolute measure of the size of the focal spot, the distances between slit and slit image respectively focal spot and slit need to be determined besides the detected values on image width of the slit in two perpendicular measurements. The first mentioned distance can simply be measured but the other is difficult to measure since the focal spot is built-in into the X-ray tube which in its turn is surrounded by protective covers. Through the utilization of the line sensor and carrying out an exposure with a diaphragm with two apertures at a short definite distance from each other on the location of the slit. however, the position of the focal spot can be easily calculated trigonometrically. The real size of the focal spot will then be equal to: the size measured on the sensor divided with the distance B sensor—slit and multiplied with the distance A focal spot—slit. Instead of two holes, other markings can be utilized, for instance slits or one larger aperture.

The invention has now been described with reference to one embodiment. Various modifications and detail designs are possible within the scope of the invention which is only limited by the wording of the patent claims.

I claim:

1. A method of measuring an x-ray radiation source in one dimension comprising the steps of:

generating an image of the x-ray radiation source by an x-ray beam being guided through a longitudinally extending slit;

detecting the image of the x-ray beam through the slit directly with substantially rectilinear line sensor elements arranged parallel to the slit so that an extension of the x-ray radiation source in a transverse direction of the slit can be measured;

processing said image into a sequence of light intensity measurement values; and presenting said measurement values as a graph on a display, whereby an extension value of a focal point of said x-ray radiation source is provided by said graph.

2. The method according to claim 1, further comprising the step of using an x-ray tube as the radiation source, the generated slit image being a measure of the focal point of the x-ray tube and a position thereof.

3. The method according to claim 2, further comprising the step of detecting the slit image for two perpendicular directions of the focal point, the size of the focal point in both directions being determined from detected intensities and being calculated by using valves of the distances between sensor, slit and focal point.

4. The method according to claim 3, further comprising the step of determining the distance between the slit and the focal point by providing a diaphragm at the slit with at least two markings and making an exposure so that the distance between the beams at the markings is detectable by the sensor, whereby a searched distance is calculated by using distance between the markings, the detected distance and the distance between the slit and the sensor.

5. The method according to claim 1, further comprising the step of aligning the line sensor elements in a same longitudinal direction as the slit with the line sensor elements being generally parallel to one another.

6. A device for measurement of an x-ray radiation source in one dimension, the device comprising an x-ray radiation source and a longitudinally extending slit, an image of the radiation source being generated by a beam guided through the slit, the image of the beam through the slit being directly irradiated upon and detected by substantially rectilinear line sensor elements arranged parallel to the slit so that the extension of the beam source in a transverse direction of the slit is determinable by a number of said directly irradiated substantially rectilinear line sensor elements, and means for processing said image into a sequence of light intensity measurement values, said processing means displays said measurement values as a graph on a display whereby an extension value of a focal point of said x-ray radiation source is provided by said graph.

7. The device according to claim 6, further comprising a strand for the slit and the sensor.

8. The device according to claim 6, further comprising a trigger element connected to the slit for trigger the sensor with line sensor elements upon activation of the beam.

9. The device according to claim 6, wherein the line sensor elements are aligned in a same longitudinal direction as the slit and the line sensor elements are generally parallel to one another.

10. The device according to claim 6, wherein the line sensor elements are included in a line sensor with forty elements per mm of length of 2.5 mm.

11. The device according to claim 6, wherein the image is presented on a display in a form of an intensity chart from the line sensor elements.

* * * * *